United States Patent
Lee

(10) Patent No.: US 9,733,452 B2
(45) Date of Patent: Aug. 15, 2017

(54) OPTICAL LENS SYSTEM WITH A WIDE FIELD OF VIEW

(71) Applicant: NEWMAX TECHNOLOGY CO., LTD., Tai-Chung (TW)

(72) Inventor: Chun-Sheng Lee, Tai-Chung (TW)

(73) Assignee: NEWMAX TECHNOLOGY CO., LTD. (TW)

( * ) Notice: Subject to any disclaimer, the term of this patent is extended or adjusted under 35 U.S.C. 154(b) by 0 days.

(21) Appl. No.: 14/985,335

(22) Filed: Dec. 30, 2015

(65) Prior Publication Data

US 2017/0192204 A1  Jul. 6, 2017

(51) Int. Cl.
   *G02B 3/02*  (2006.01)
   *G02B 13/00*  (2006.01)
   *G02B 9/16*  (2006.01)
   *G02B 27/00*  (2006.01)
   *G02B 5/20*  (2006.01)

(52) U.S. Cl.
   CPC ......... *G02B 13/0035* (2013.01); *G02B 5/208* (2013.01); *G02B 9/16* (2013.01); *G02B 27/0025* (2013.01); *G02B 27/0081* (2013.01)

(58) Field of Classification Search
   CPC .................................................. G02B 13/0035
   USPC .......................................................... 359/716
   See application file for complete search history.

(56) References Cited

U.S. PATENT DOCUMENTS

| 8,335,043 | B2 | 12/2012 | Huang |
| 8,395,853 | B2 | 3/2013 | Chen et al. |
| 8,576,497 | B2 | 11/2013 | Hsu et al. |
| 8,593,737 | B2 | 11/2013 | Tang et al. |
| 2016/0223787 | A1* | 8/2016 | Liu ............... G02B 13/0035 |

* cited by examiner

*Primary Examiner* — James Jones
(74) *Attorney, Agent, or Firm* — Bruce Stone LLP; Joseph Bruce

(57) ABSTRACT

An optical lens system with a wide field of view includes, in order from the object side to the image side: a stop, a first lens element with a positive refractive power, a second lens element with a negative refractive power, and a third lens element with a positive refractive power. A focal length of the first lens element and the second lens element combined is f12, a focal length of the third lens element is f3, and they satisfy the relation: 0.3<f12/f3<0.9, so that the optical lens system has a wide field of view, high resolution, short length and less distortion.

13 Claims, 8 Drawing Sheets

OPTICAL LENS SYSTEM WITH A WIDE FIELD OF VIEW

BACKGROUND OF THE INVENTION

Field of the Invention

The present invention relates to an optical lens system, and more particularly to a miniaturized three-piece optical lens system with a wide field of view.

Related Prior Art

In recent years, with the popularity of electronic products with the function of taking photographs, there's an increasing demand for an optical lens system. In order to obtain a wider shooting range, the lens angle should meet certain requirements. The field of view of the lens is usually designed to be 50 to 60 degrees, if over the above designed angle, the aberration will be larger and the lens design will be more complex. For example, the optical lens systems as disclosed in U.S. Pat. Nos. 8,335,043 and 8,576,497 use two lens groups and 5-6 pieces of lens elements to obtain a wide field of view, however, their distortion is increased. The optical lens systems as disclosed in U.S. Pat. Nos. 8,593,737, 8,576,497 and 8,395,853 also have a wide field of view, but their TL (total length) of the entire optical lens system is too long.

Therefore, the motivation of the present invention is to develop a miniaturized optical lens system which not only can be applied to the lenses of electronic products, such as digital camera, Webcam, mobile phone, but also has a wide field of view and a reduced aberration, so as to reduce the design complexity of the lens system.

SUMMARY

The present invention is aimed at providing a three-piece optical lens system which has a wide field of view, high resolution, short length and less distortion.

An optical lens system with a wide field of view in accordance with the present invention, in order from an object side to the image side, comprises: a stop; a first lens element with a positive refractive power having an object-side surface being convex near an optical axis and an image-side surface being convex near the optical axis, at least one of the object-side surface and the image-side surface of the first lens element being aspheric; a second lens element with a negative refractive power having an object-side surface being concave near the optical axis and an image-side surface being convex near the optical axis, at least one of the object-side surface and the image-side surface of the second lens element being aspheric; a third lens element with a positive refractive power having an object-side surface being convex near the optical axis and an image-side surface being concave near the optical axis, at least one of the object-side surface and the image-side surface of the third lens element being aspheric and provided with at least one inflection point.

Wherein a focal length of the first lens element and the second lens element combined is f12, a focal length of the third lens element is f3, and they satisfy the relation:

$0.3 < f12/f3 < 0.9$.

When the above relation is satisfied, a wide field of view can be obtained and the resolution can be improved evidently.

Preferably, a focal length of the first lens element is f1, a focal length of the second lens element is f2, and they satisfy the relation: $-0.7 < f1/f2 < -0.35$, so that the refractive power of the first lens element and the second lens element are more suitable, it will be favorable to obtain a wide field of view and avoid the excessive increase of aberration of the system.

Preferably, the focal length of the second lens element is f2, the focal length of the third lens element is f3, and they satisfy the relation: $-0.85 < f2/f3 < -0.35$, so that the refractive power of the second lens element and the third lens element are more balanced, it will be favorable to correct the aberration of the system and reduce the sensitivity of the system.

Preferably, the focal length of the first lens element is f1, the focal length of the third lens element is f3, and they satisfy the relation: $0.1 < f1/f3 < 0.45$, so that the positive refractive power of the first lens element can be distributed effectively, so as to reduce the sensitivity of the optical lens system with a wide field of view.

Preferably, a focal length of the first lens element is f1, a focal length of the second lens element and the third lens element combined is f23, and they satisfy the relation: $-0.45 < f1/f23 < -0.05$, so that a wide field of view can be obtained and the resolution can be improved evidently.

Preferably, a focal length of the optical lens system with a wide field of view is f, a focal length of the second lens element and the third lens element combined is f23, and they satisfy the relation: $-8 < f23/f < -1.7$. If f23/f satisfies the above relation, a wide field of view, big stop, high pixel and low height can be provided and the resolution can be improved evidently. Contrarily, if f23/f exceeds the above range, the performance and resolution of the optical lens system with a wide field of view will be reduced, and the yield rate will be low.

Preferably, the focal length of the optical lens system with a wide field of view is f, a distance from the object-side surface of the first lens element to the image plane 180 along the optical axis is TL, and they satisfy the relation: $0.5 < f/TL < 0.8$. When this relation is satisfied, it will be favorable to obtain a wide field of view and maintain the objective of miniaturization of the optical lens system with a wide field of view, and the lens system can be used in thin and light electronic products.

Preferably, the optical lens system has a maximum view angle FOV, and it satisfies the relation: $75 < FOV < 95$, so that the optical lens system will have an appropriately large field of view.

Preferably, a central thickness of the first lens element along the optical axis is CT1, a central thickness of the second lens element along the optical axis is CT2, and they satisfy the following relation: $1.5 < CT1/CT2 < 2.5$, so that the second and third lens elements will have an appropriate thickness to facilitate the injection molding process.

Preferably, a distance along the optical axis between the first lens element and the second lens element is T12, the central thickness of the second lens element along the optical axis is CT2, and they satisfy the following relation: $0.5 < T12/CT2 < 0.95$, so that the field of view of the optical lens system can further be widened.

Preferably, a distance along the optical axis between the second lens element and the third lens element is T23, a central thickness of the third lens element along the optical axis is CT3, and they satisfy the following relation: $0.05 < T23/CT3 < 0.7$, so that the field of view of the optical lens system can further be widened.

Preferably, the central thickness of the second lens element along the optical axis is CT2, the central thickness of the third lens element along the optical axis is CT3, and they satisfy the following relation: $0.9 < CT3/CT2 < 1.9$, which can further reduce the length of the optical lens system, and facilitate the molding of the second and third lens elements.

Preferably, a radius of curvature of the image-side surface of the first lens element is R2, a radius of curvature of the image-side surface of the second lens element is R3, and they satisfy the following relation: 2.4<R2/R3<3.7, which can reduce the spherical aberration and astigmatism of the optical lens system effectively.

Preferably, a radius of curvature of the image-side surface of the second lens element is R4, a radius of curvature of the object-side surface of the third lens element is R5, and they satisfy the following relation: −1.55<R4/R5<−0.5, which can reduce the spherical aberration and astigmatism of the optical lens system effectively.

Preferably, an Abbe number of the first lens element is V1, an Abbe number of the second lens element is V2, and they satisfy the following relation: 30<V1−V2<42, which can reduce the chromatic aberration of the optical lens system effectively.

DETAILED DESCRIPTION

The present invention will be clearer from the following description when viewed together with the accompanying drawings, which show, for purpose of illustrations only, the preferred embodiment in accordance with the present invention.

Figure 1A:
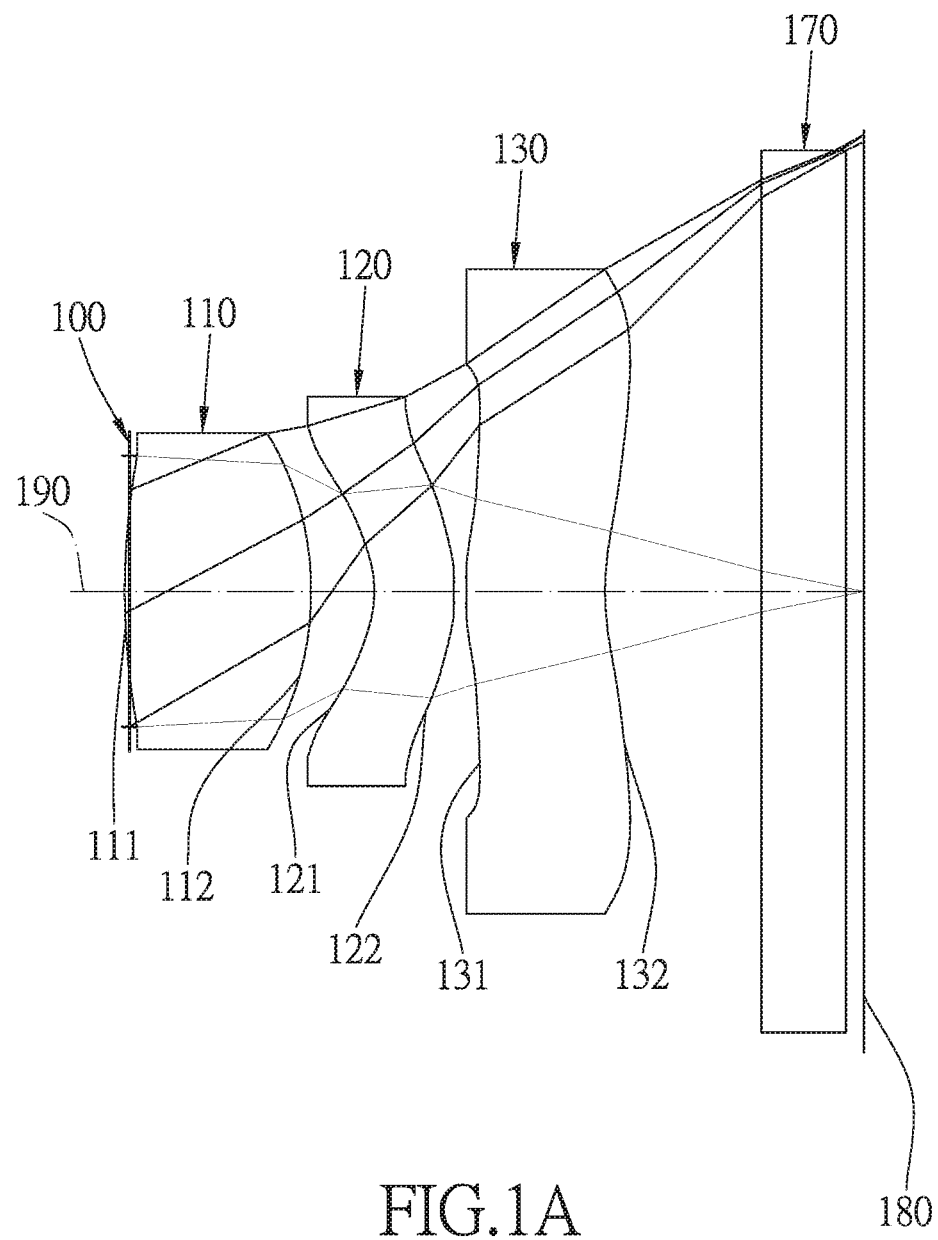
FIG. 1A shows an optical lens system with a wide field of view in accordance with a first embodiment of the present invention.
Figure 1B:
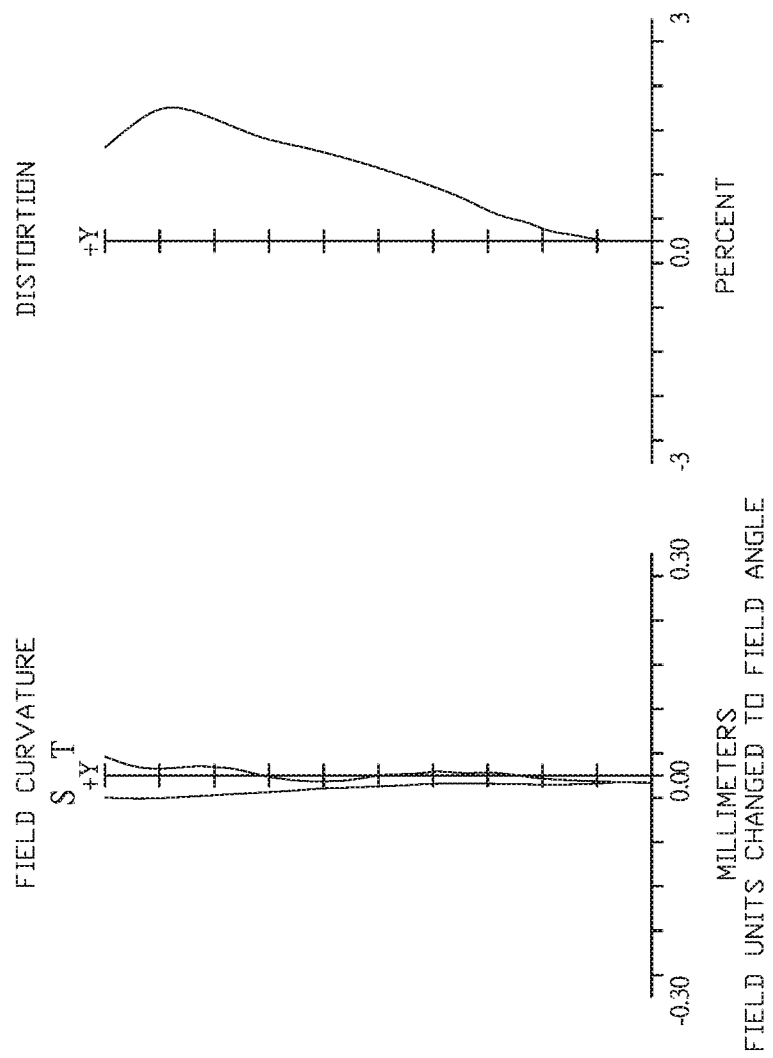
FIG. 1B shows the longitudinal spherical aberration curve, the astigmatic field curve and the distortion curve of the first embodiment of the present invention.

Referring to FIGS. 1A and 1B, FIG. 1A shows an optical lens system with a wide field of view in accordance with a first embodiment of the present invention, and FIG. 1B shows, in order from left to right, the longitudinal spherical aberration curves, the astigmatic field curves, and the distortion curve of the first embodiment of the present invention. An optical lens system with a wide field of view in accordance with the first embodiment of the present invention comprises a stop 100 and a lens group. The lens group comprises, in order from an object side to the image side: a first lens element 110, a second lens element 120, a third lens element 130, an IR cut filter 170 which is made of glass, and an image plane 180, wherein the optical lens system with a wide field of view has a total of three lens elements with refractive power. The stop 100 is disposed between an image-side surface 112 of the first lens element 110 and an object to be imaged.

The first lens element 110 with a positive refractive power has an object-side surface 111 being convex near an optical axis 190 and an image-side surface 112 being convex near the optical axis 190, the object-side surface 111 and the image-side surface 112 are aspheric, and the first lens element 110 is made of plastic material.

The second lens element 120 with a negative refractive power has an object-side surface 121 being concave near the optical axis 190 and an image-side surface 122 being convex near the optical axis 190, the object-side surface 121 and the image-side surface 122 are aspheric, and the second lens element 120 is made of plastic material.

The third lens element 130 with a positive refractive power has an object-side surface 131 being convex near the optical axis 190 and an image-side surface 132 being concave near the optical axis 190, the object-side surface 131 and the image-side surface 132 are aspheric, the third lens element 130 is made of plastic material, and at least one of the object-side surface 131 and the image-side surface 132 is provided with at least one inflection point.

The IR cut filter 170 made of glass is located between the third lens element 130 and the image plane 180 and has no influence on the focal length of the optical lens system with a wide field of view.

The equation for the aspheric surface profiles of the respective lens elements of the first embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, G, . . . : represent the high-order aspheric coefficients.

In the first embodiment of the present optical lens system with a wide field of view, the focal length of the optical lens system with a wide field of view is f, the f-number of the optical lens system with a wide field of view is Fno, the optical lens system with a wide field of view has a maximum view angle (field of view) FOV, and they satisfy the relations:

$f$=1.261 mm;

$Fno$=2.0; and

FOV=77 degrees.

In the first embodiment of the present optical lens system with a wide field of view, a focal length of the first lens element 110 and the second lens element 120 combined is f12, a focal length of the third lens element 130 is f3, and they satisfy the relation:

$f12/f3$=0.3875.

In the first embodiment of the present optical lens system with a wide field of view, a focal length of the first lens element 110 is f1, a focal length of the second lens element 120 is f2, and they satisfy the relation:

$f1/f2=-0.5152.$

In the first embodiment of the present optical lens system with a wide field of view, the focal length of the second lens element 120 is f2, the focal length of the third lens element 130 is f3, and they satisfy the relation:

$f2/f3=-0.3650.$

In the first embodiment of the present optical lens system with a wide field of view, the focal length of the first lens element 110 is f1, the focal length of the third lens element 130 is f3, and they satisfy the relation:

$f1/f3=0.1881.$

In the first embodiment of the present optical lens system with a wide field of view, the focal length of the first lens element 110 is f1, a focal length of the second lens element 120 and the third lens element 130 combined is f23, and they satisfy the relation:

$f1/f23=-0.3430.$

In the first embodiment of the present optical lens system with a wide field of view, a focal length of the optical lens system with a wide field of view is f, the focal length of the second lens element 120 and the third lens element 130 combined is f23, and they satisfy the relation:

$f23/f=-2.0062.$

In the first embodiment of the present optical lens system with a wide field of view, the focal length of the optical lens system with a wide field of view is f, the distance from the object-side surface 111 of the first lens element 110 to the image plane 180 along the optical axis 190 is TL, and they satisfy the relation:

$f/TL=0.6731.$

In the first embodiment of the present optical lens system, a central thickness of the first lens element 110 along the optical axis 190 is CT1, a central thickness of the second lens element 120 along the optical axis 190 is CT2, and they satisfy the following relation:

$CT1/CT2=2.3224.$

In the first embodiment of the present optical lens system, a distance along the optical axis 190 between the first lens element 110 and the second lens element 120 is T12, a central thickness of the second lens element 120 along the optical axis 190 is CT2, and they satisfy the following relation:

$T12/CT2=0.7941.$

In the first embodiment of the present optical lens system, a distance along the optical axis 190 between the second lens element 120 and the third lens element 130 is T23, a central thickness of the third lens element 130 along the optical axis 190 is CT3, and they satisfy the following relation:

$T23/CT3=0.0844.$

In the first embodiment of the present optical lens system, the central thickness of the second lens element 120 along the optical axis 190 is CT2, the central thickness of the third lens element 130 along the optical axis 190 is CT3, and they satisfy the following relation:

$CT3/CT2=1.7484.$

In the first embodiment of the present optical lens system, a radius of curvature of the image-side surface 112 of the first lens element 110 is R2, a radius of curvature of the image-side surface 121 of the second lens element 120 is R3, and they satisfy the following relation:

$R2/R3=2.6916.$

In the first embodiment of the present optical lens system, a radius of curvature of the image-side surface 122 of the second lens element 120 is R4, a radius of curvature of the object-side surface 131 of the third lens element 130 is R5, and they satisfy the following relation:

$R4/R5=-0.6278.$

In the first embodiment of the present optical lens system, an Abbe number of the first lens element 110 is V1, an Abbe number of the second lens element 120 is V2, and they satisfy the following relation:

$V1-V2=34.5.$

The detailed optical data of the first embodiment is shown in table 1, and the aspheric surface data is shown in table 2.

TABLE 1

Embodiment 1
f(focal length) = 1.261 mm, Fno = 2.0, FOV = 77 deg.

| Surface | | Curvature Radius | Thickness | Material | index | Abbe # | Focal length |
|---|---|---|---|---|---|---|---|
| 0 | Object | Infinity | 500.000 | | | | |
| 1 | | Infinity | 0.000 | | | | |
| 2 | stop | Infinity | −0.015 | | | | |
| 3 | Lens 1 | 1.064 (ASP) | 0.472 | Plastic | 1.544 | 56.000 | 0.868 |
| 4 | | −0.717 (ASP) | 0.162 | | | | |
| 5 | Lens 2 | −0.266 (ASP) | 0.203 | Plastic | 1.651 | 21.500 | −1.685 |
| 6 | | −0.457 (ASP) | 0.030 | | | | |
| 7 | Lens 3 | 0.728 (ASP) | 0.356 | Plastic | 1.544 | 56.000 | 4.615 |
| 8 | | 0.849 (ASP) | 0.396 | | | | |
| 9 | IR-filter | Infinity | 0.210 | Glass | 1.517 | 64.167 | — |
| 10 | | Infinity | 0.045 | | | | |
| 11 | Image | Infinity | Infinity | | | | |

TABLE 2

| Aspheric Coefficients | | | |
|---|---|---|---|
| Surface # | 3 | 4 | 5 |
| K = | 1.3254E+00 | 8.1270E−01 | −2.0708E+00 |
| A = | −1.2526E+00 | −6.1063E−01 | −1.0513E+00 |
| B = | 1.3739E+01 | −1.0199E+01 | −1.8279E+01 |
| C = | −4.9471E+02 | 1.0909E+02 | 7.2782E+02 |
| D = | 7.5109E+03 | 3.4441E+02 | −4.6061E+03 |
| E = | −6.3337E+04 | −6.9899E+03 | 3.2982E+03 |
| F = | 2.1272E+05 | 1.9473E+04 | 3.2064E+04 |
| Surface # | 6 | 7 | 8 |
| K = | −3.8028E+00 | −3.6352E−01 | −5.1363E−01 |
| A = | −3.1873E+00 | −4.9778E+00 | −2.2207E+00 |
| B = | 2.6712E+01 | 1.9927E+01 | 4.7435E+00 |
| C = | −6.1788E+01 | −5.3567E+01 | −9.6097E+00 |
| D = | 7.6511E+02 | v9.6477E+01 | 1.1568E+01 |
| E = | −5.6296E+03 | 1.0192E+03 | −6.8359E+00 |
| F = | 1.2124E+04 | −2.0130E+03 | −5.4213E−01 |

The units of the radius of curvature, the thickness and the focal length in table 1 are expressed in mm, the surface numbers 0-11 represent the surfaces sequentially arranged from the object-side to the image-side along the optical axis. In table 2, k represents the conic coefficient of the equation of the aspheric surface profiles, and A, B, C, D, E, G, . . . : represent the high-order aspheric coefficients. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
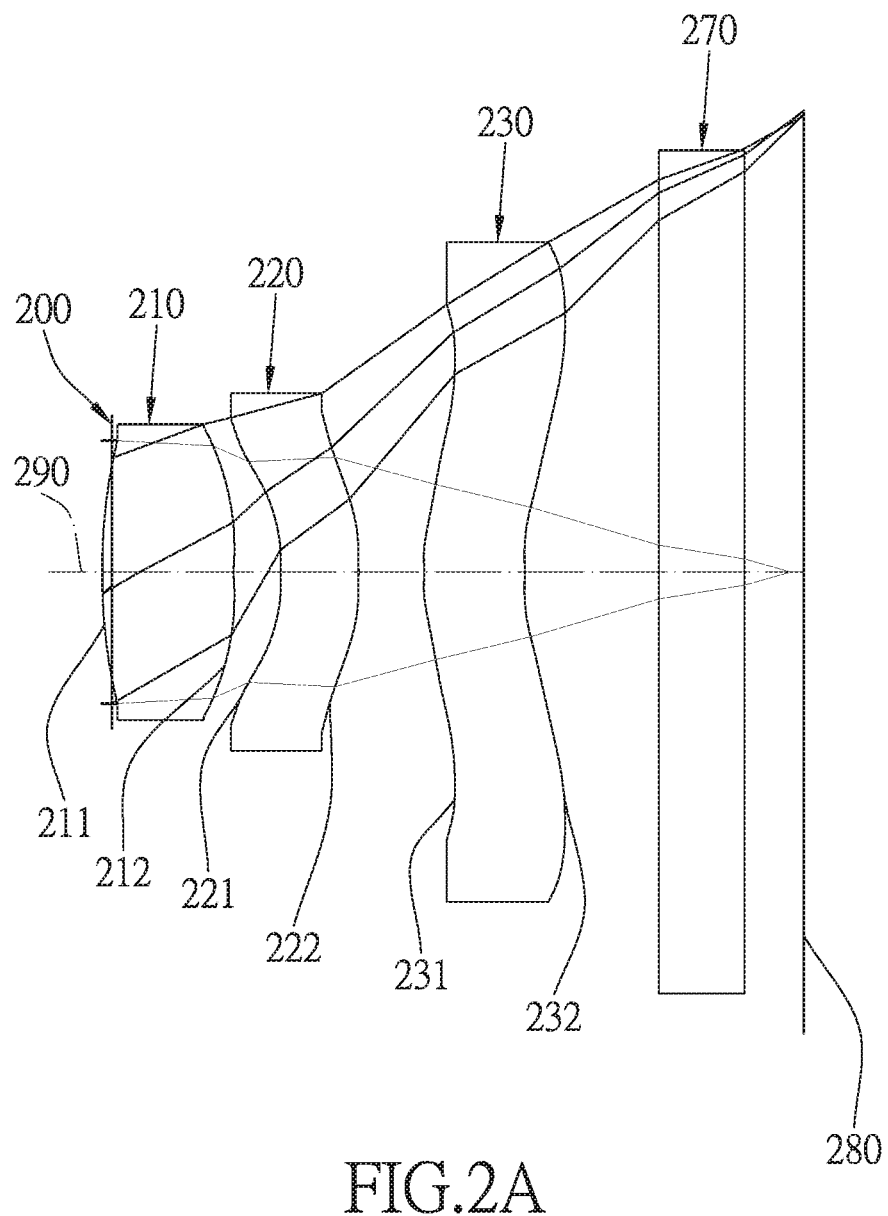
FIG. 2A shows an optical lens system with a wide field of view in accordance with a second embodiment of the present invention.
Figure 2B:
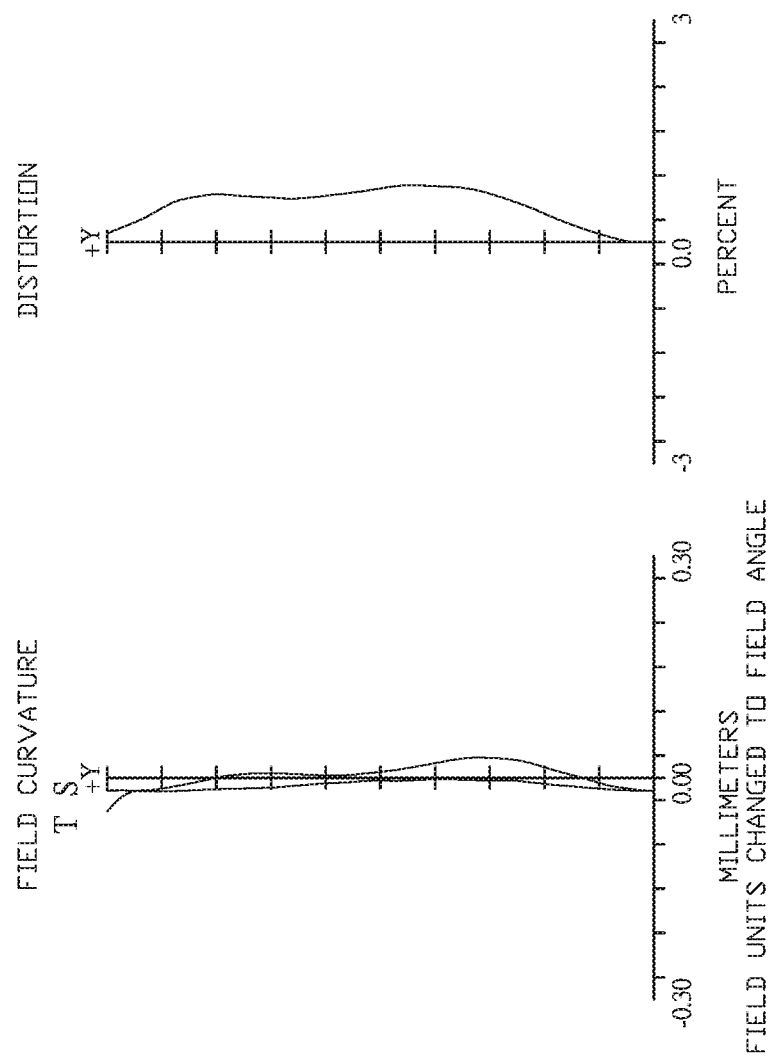
FIG. 2B shows the longitudinal spherical aberration curve, the astigmatic field curve and the distortion curve of the second embodiment of the present invention.

Referring to FIGS. 2A and 2B, FIG. 2A shows an optical lens system with a wide field of view in accordance with a second embodiment of the present invention, and FIG. 2B shows, in order from left to right, the longitudinal spherical aberration curves, the astigmatic field curves, and the distortion curve of the second embodiment of the present invention. An optical lens system with a wide field of view in accordance with the second embodiment of the present invention comprises a stop 200 and a lens group. The lens group comprises, in order from an object side to the image side: a first lens element 210, a second lens element 220, a third lens element 230, an IR cut filter 270 which is made of glass, and an image plane 280, wherein the optical lens system with a wide field of view has a total of three lens elements with refractive power. The stop 200 is disposed between an image-side surface 212 of the first lens element 210 and an object to be imaged.

The first lens element 210 with a positive refractive power has an object-side surface 211 being convex near an optical axis 290 and an image-side surface 212 being convex near the optical axis 290, the object-side surface 211 and the image-side surface 212 are aspheric, and the first lens element 210 is made of plastic material.

The second lens element 220 with a negative refractive power has an object-side surface 221 being concave near the optical axis 290 and an image-side surface 222 being convex near the optical axis 290, the object-side surface 221 and the image-side surface 222 are aspheric, and the second lens element 220 is made of plastic material.

The third lens element 230 with a positive refractive power has an object-side surface 231 being convex near the optical axis 290 and an image-side surface 232 being concave near the optical axis 290, the object-side surface 231 and the image-side surface 232 are aspheric, the third lens element 230 is made of plastic material, and at least one of the object-side surface 231 and the image-side surface 232 is provided with at least one inflection point.

The IR cut filter 270 made of glass is located between the third lens element 230 and the image plane 280 and has no influence on the focal length of the optical lens system with a wide field of view.

The detailed optical data of the second embodiment is shown in table 3, and the aspheric surface data is shown in table 4.

TABLE 3

Embodiment 2
f(focal length) = 1.24 mm, Fno = 2.0, FOV = 78 deg.

| Surface | | Curvature Radius | Thickness | Material | index | Abbe # | Focal length |
|---|---|---|---|---|---|---|---|
| 0 | Object | Infinity | 500.000 | | | | |
| 1 | | Infinity | 0.000 | | | | |
| 2 | stop | Infinity | −0.025 | | | | |
| 3 | Lens 1 | 0.886 (ASP) | 0.331 | Plastic | 1.544 | 56.000 | 1.074 |
| 4 | | −1.466 (ASP) | 0.121 | | | | |
| 5 | Lens 2 | −0.421 (ASP) | 0.192 | Plastic | 1.651 | 21.500 | −2.291 |
| 6 | | −0.694 (ASP) | 0.163 | | | | |
| 7 | Lens 3 | 0.477 (ASP) | 0.251 | Plastic | 1.535 | 56.000 | 3.140 |
| 8 | | 0.547 (ASP) | 0.340 | | | | |
| 9 | IR-filter | Infinity | 0.210 | Glass | 1.517 | 64.167 | — |
| 10 | | Infinity | 0.150 | | | | |
| 11 | Image | Infinity | Infinity | | | | |

TABLE 4

| Aspheric Coefficients | | | |
|---|---|---|---|
| surface # | 3 | 4 | 5 |
| K = | −1.9566E+00 | 1.1982E+01 | −2.5128E−01 |
| A = | −5.4445E−01 | −2.8218E+00 | −4.2590E+00 |
| B = | 1.2215E+00 | −2.2349E+00 | 5.6898E+01 |
| C = | −7.7254E+00 | 2.1695E+01 | 6.5023E+01 |
| D = | −6.2292E+02 | 2.5877E+02 | 3.6131E+02 |
| E = | −1.5113E+04 | 1.7908E+03 | −1.1856E+04 |
| F = | 1.4333E+05 | −4.8661E+03 | 4.0487E+04 |
| surface # | 6 | 7 | 8 |
| K = | 8.9298E−01 | −5.8224E+00 | −3.6944E+00 |
| A = | −4.1282E+00 | −2.0766E+00 | −1.8624E+00 |
| B = | 4.4471E+01 | 6.0519E+00 | 5.3892E+00 |
| C = | 2.9344E+00 | −7.2777E+00 | −9.6768E+00 |
| D = | −2.5330E+02 | −1.4366E+01 | 5.5155E+00 |

TABLE 4-continued

Aspheric Coefficients

| | | | |
|---|---|---|---|
| E = | −4.2475E+02 | 3.3116E+01 | 4.9208E+00 |
| F = | 3.4756E+03 | −1.3660E+01 | −6.4993E+00 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f | 1.240 | f/TL | 0.7051 |
| Fno | 2.0 | CT1/CT2 | 1.7234 |
| FOV | 78 | T12/CT2 | 0.6275 |
| f1/f2 | −0.4688 | T23/CT3 | 0.6494 |
| f2/f3 | −0.7298 | CT3/CT2 | 1.3083 |
| f12/f3 | 0.6371 | R2/R3 | 3.4842 |
| f1/f3 | 0.3421 | R4/R5 | −1.4540 |
| f1/f23 | −0.1159 | V1-V2 | 34.5 |
| f23/f | −7.4710 | | |

Figure 3A:
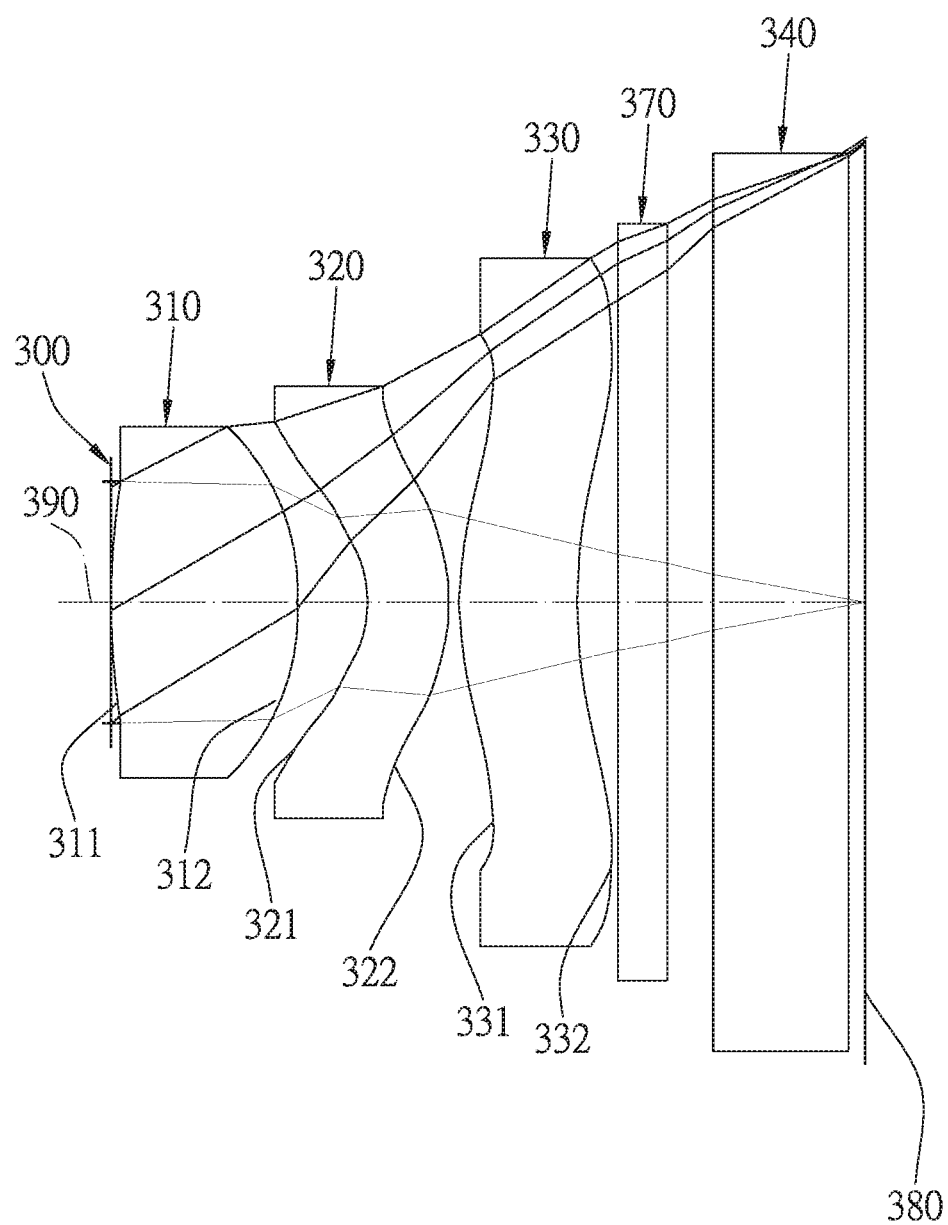
FIG. 3A shows an optical lens system with a wide field of view in accordance with a third embodiment of the present invention.
Figure 3B:
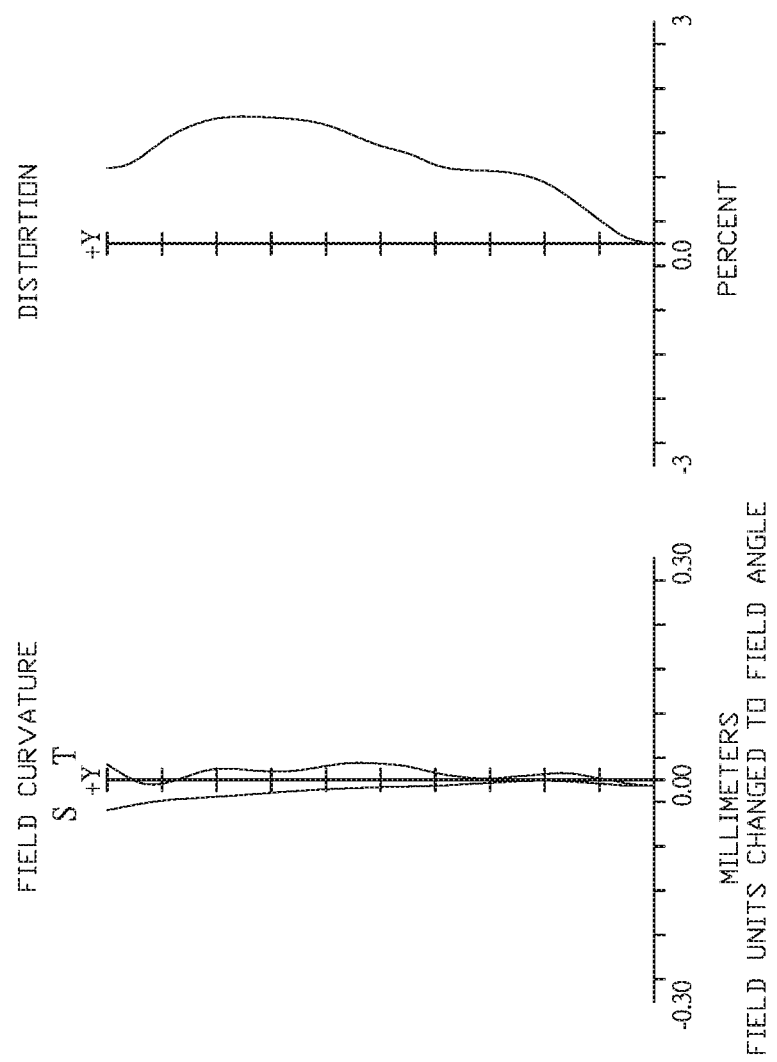
FIG. 3B shows the longitudinal spherical aberration curve, the astigmatic field curve and the distortion curve of the third embodiment of the present invention.

Referring to FIGS. 3A and 3B, FIG. 3A shows an optical lens system with a wide field of view in accordance with a third embodiment of the present invention, and FIG. 3B shows, in order from left to right, the longitudinal spherical aberration curves, the astigmatic field curves, and the distortion curve of the third embodiment of the present invention. An optical lens system with a wide field of view in accordance with the third embodiment of the present invention comprises a stop 300 and a lens group. The lens group comprises, in order from an object side to the image side: a first lens element 310, a second lens element 320, a third lens element 330, an IR cut filter 370 which is made of glass, a cover glass 340, and an image plane 380, wherein the optical lens system with a wide field of view has a total of three lens elements with refractive power. The stop 300 is disposed between an image-side surface 312 of the first lens element 310 and an object to be imaged.

The first lens element 310 with a positive refractive power has an object-side surface 311 being convex near an optical axis 390 and an image-side surface 312 being convex near the optical axis 390, the object-side surface 311 and the image-side surface 312 are aspheric, and the first lens element 310 is made of plastic material.

The second lens element 320 with a negative refractive power has an object-side surface 321 being concave near the optical axis 390 and an image-side surface 322 being convex near the optical axis 390, the object-side surface 321 and the image-side surface 322 are aspheric, and the second lens element 320 is made of plastic material.

The third lens element 330 with a positive refractive power has an object-side surface 331 being convex near the optical axis 390 and an image-side surface 332 being concave near the optical axis 390, the object-side surface 331 and the image-side surface 332 are aspheric, the third lens element 330 is made of plastic material, and at least one of the object-side surface 331 and the image-side surface 332 is provided with at least one inflection point.

The IR cut filter 370 made of glass is located between the third lens element 330 and the image plane 380 and has no influence on the focal length of the optical lens system with a wide field of view.

The cover glass 340 is disposed between the IR cut filter 370 and the image plane 390 to protect sensing elements (not shown) and has no influence on the focal length of the optical lens system with a wide field of view.

The detailed optical data of the third embodiment is shown in table 5, and the aspheric surface data is shown in table 6.

TABLE 5

Embodiment 3
f(focal length) = 1.311 mm, Fno = 2.0, FOV = 84 deg.

| Surface | | Curvature Radius | Thickness | Material | index | Abbe # | Focal length |
|---|---|---|---|---|---|---|---|
| 0 | object | Infinity | Infinity | | | | |
| 1 | | Infinity | 0.000 | | | | |
| 2 | stop | Infinity | −0.001 | | | | |
| 3 | Lens 1 | 1.424 (ASP) | 0.547 | plastic | 1.544 | 56.000 | 0.937 |
| 4 | | −0.690 (ASP) | 0.203 | | | | |
| 5 | Lens 2 | −0.257 (ASP) | 0.236 | plastic | 1.651 | 21.500 | −1.612 |
| 6 | | −0.463 (ASP) | 0.030 | | | | |
| 7 | Lens 3 | 0.701 (ASP) | 0.345 | plastic | 1.544 | 56.000 | 2.734 |
| 8 | | 1.091 (ASP) | 0.120 | | | | |
| 9 | IR filter | Infinity | 0.145 | glass | 1.517 | 64.167 | — |
| 10 | | Infinity | 0.130 | | | | |
| 11 | Cover glass | Infinity | 0.4 | glass | 1.517 | 64.167 | — |
| 12 | | Infinity | 0.045 | | | | |
| 13 | Image | Infinity | Infinity | | | | |

TABLE 6

Aspheric Coefficients

| surface # | 3 | 4 | 5 |
|---|---|---|---|
| K = | 1.7206E+00 | −1.0243E−01 | −2.3651E+00 |
| A = | −7.4912E−01 | −3.7511E−01 | −3.7050E+00 |
| B = | 3.0527E+00 | −5.9026E+00 | 2.8943E+00 |
| C = | −1.5457E+02 | −2.8241E+00 | 2.3647E+02 |
| D = | 2.2136E+03 | 4.9721E+02 | −1.1944E+03 |
| E = | −1.8019E+04 | −2.7550E+03 | 1.4902E+03 |
| F = | 5.5048E+04 | 4.1785E+03 | 9.2168E+02 |

TABLE 6-continued

| Aspheric Coefficients | | | |
|---|---|---|---|
| surface # | 6 | 7 | 8 |
| K = | −4.8653E+00 | −2.2993E−01 | −5.9393E−01 |
| A = | −2.7900E+00 | −2.0212E+00 | −5.9987E−01 |
| B = | 1.2612E+01 | 8.5377E−01 | 2.1012E−01 |
| C = | −2.9967E+01 | 1.1985E+01 | −3.8023E−01 |
| D = | 1.9981E+02 | −6.5153E+01 | 3.7351E−01 |
| E = | −7.0722E+02 | 1.2959E+02 | −2.3750E−02 |
| F = | 8.0447E+02 | −9.8792E+01 | −2.2240E−01 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f | 1.311 | f/TL | 0.5955 |
| Fno | 2.0 | CT1/CT2 | 2.3150 |
| FOV | 84 | T12/CT2 | 0.8591 |
| f1/f2 | −0.5810 | T23/CT3 | 0.0868 |
| f2/f3 | −0.5897 | CT3/CT2 | 1.4605 |
| f12/f3 | 0.8134 | R2/R3 | 2.6850 |
| f1/f3 | 0.3426 | R4/R5 | −0.6609 |
| f1/f23 | −0.1720 | V1−V2 | 32.1 |
| f23/f | −4.1530 | | |

Figure 4A:
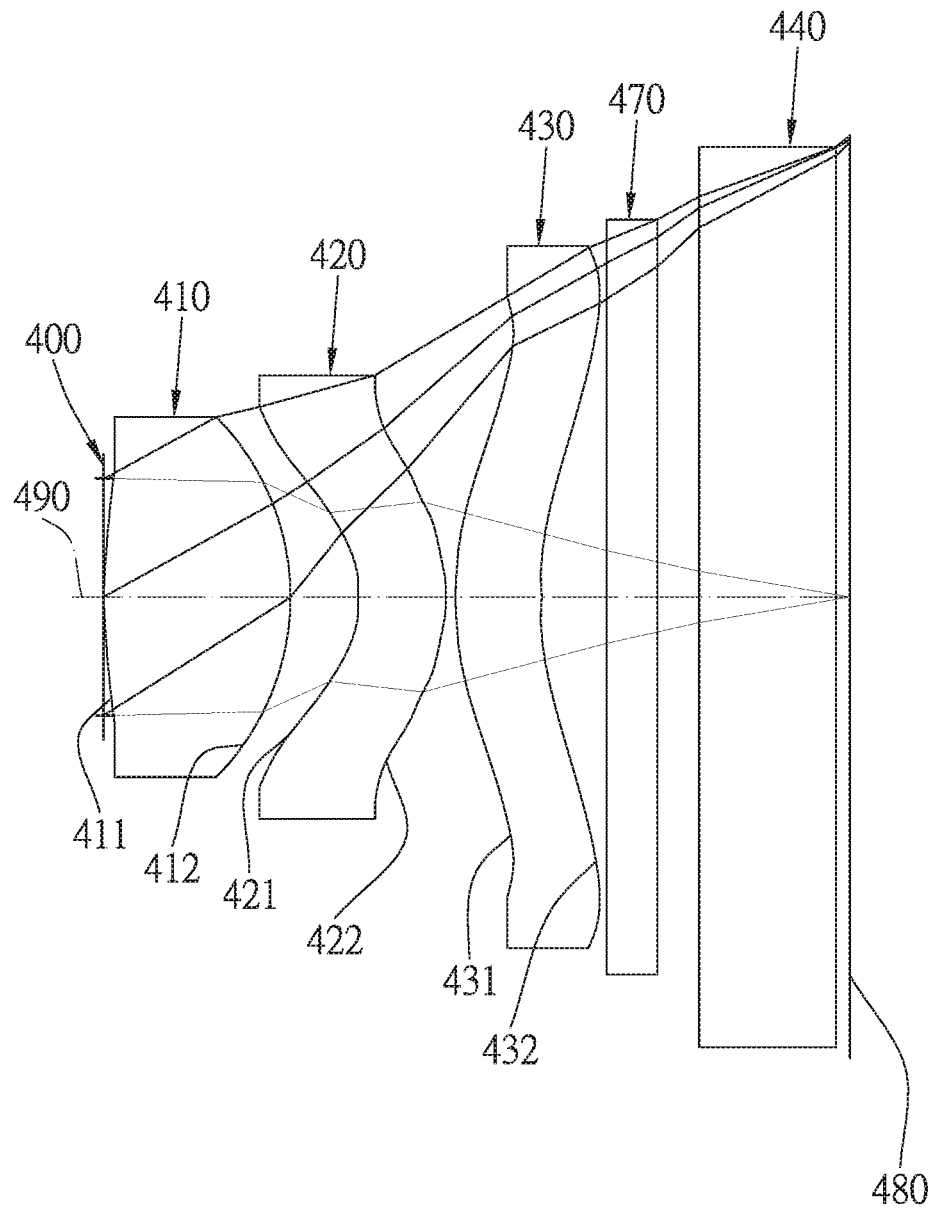
FIG. 4A shows an optical lens system with a wide field of view in accordance with a fourth embodiment of the present invention.
Figure 4B:
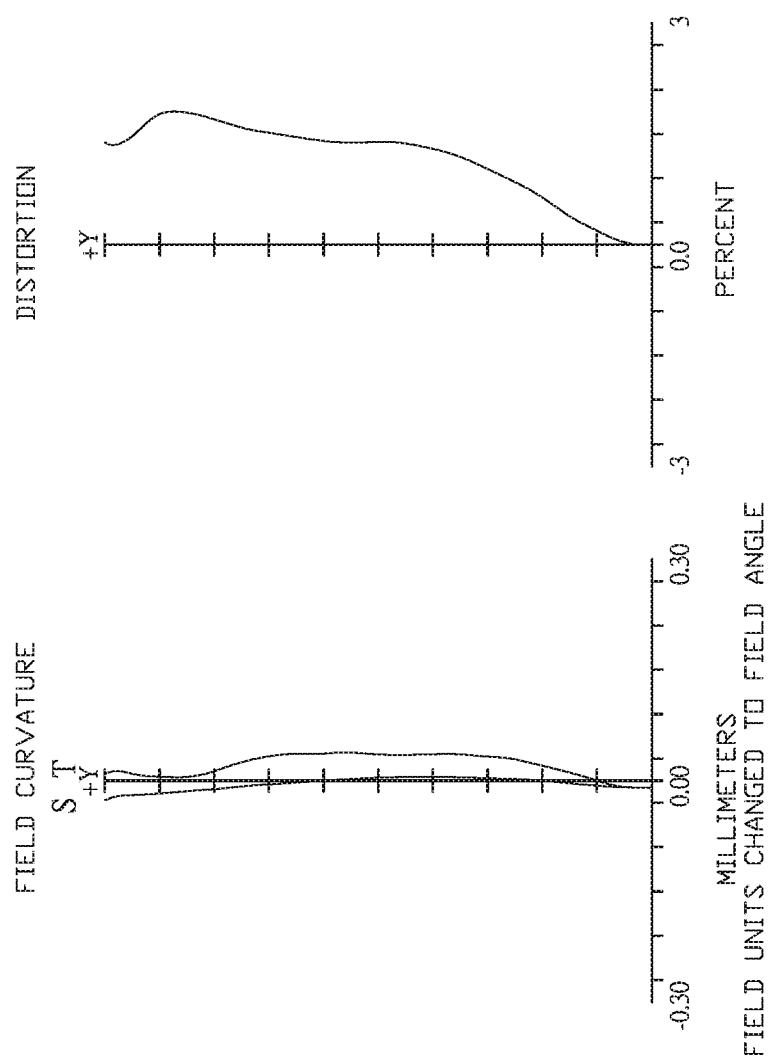
FIG. 4B shows the longitudinal spherical aberration curve, the astigmatic field curve and the distortion curve of the fourth embodiment of the present invention.

Referring to FIGS. 4A and 4B, FIG. 4A shows an optical lens system with a wide field of view in accordance with a fourth embodiment of the present invention, and FIG. 4B shows, in order from left to right, the longitudinal spherical aberration curves, the astigmatic field curves, and the distortion curve of the fourth embodiment of the present invention. An optical lens system with a wide field of view in accordance with the fourth embodiment of the present invention comprises a stop 400 and a lens group. The lens group comprises, in order from an object side to the image side: a first lens element 410, a second lens element 420, a third lens element 430, an IR cut filter 470 which is made of glass, a cover glass 440, and an image plane 480, wherein the optical lens system with a wide field of view has a total of three lens elements with refractive power. The stop 400 is disposed between an image-side surface 412 of the first lens element 410 and an object to be imaged.

The first lens element 410 with a positive refractive power has an object-side surface 411 being convex near an optical axis 490 and an image-side surface 412 being convex near the optical axis 490, the object-side surface 411 and the image-side surface 412 are aspheric, and the first lens element 410 is made of plastic material.

The second lens element 420 with a negative refractive power has an object-side surface 421 being concave near the optical axis 490 and an image-side surface 422 being convex near the optical axis 490, the object-side surface 421 and the image-side surface 422 are aspheric, and the second lens element 420 is made of plastic material.

The third lens element 430 with a positive refractive power has an object-side surface 431 being convex near the optical axis 490 and an image-side surface 432 being concave near the optical axis 490, the object-side surface 431 and the image-side surface 432 are aspheric, the third lens element 430 is made of plastic material, and at least one of the object-side surface 431 and the image-side surface 432 is provided with at least one inflection point.

The IR cut filter 470 made of glass is located between the third lens element 430 and the image plane 480 and has no influence on the focal length of the optical lens system with a wide field of view.

The cover glass 440 is disposed between the IR cut filter 470 and the image plane 490 to protect sensing elements (not shown) and has no influence on the focal length of the optical lens system with a wide field of view.

The detailed optical data of the third embodiment is shown in table 7, and the aspheric surface data is shown in table 8.

TABLE 7

Embodiment 4
f(focal length) = 1.301 mm, Fno = 2.0, FOV = 84 deg.

| Surface | | Curvature Radius | Thickness | Material | index | Abbe # | Focal length |
|---|---|---|---|---|---|---|---|
| 0 | object | Infinity | Infinity | | | | |
| 1 | | Infinity | 0.000 | | | | |
| 2 | stop | Infinity | 0.005 | | | | |
| 3 | Lens 1 | 1.484 (ASP) | 0.545 | plastic | 1.535 | 56.000 | 0.978 |
| 4 | | −0.708 (ASP) | 0.202 | | | | |
| 5 | Lens 2 | −0.272 (ASP) | 0.255 | plastic | 1.634 | 23.900 | −2.099 |
| 6 | | −0.466 (ASP) | 0.028 | | | | |
| 7 | Lens 3 | 0.606 (ASP) | 0.250 | plastic | 1.535 | 56.000 | 3.217 |
| 8 | | 0.800 (ASP) | 0.192 | | | | |
| 9 | IR filter | Infinity | 0.145 | glass | 1.517 | 64.167 | — |
| 10 | | Infinity | 0.130 | | | | |
| 11 | Cover glass | Infinity | 0.400 | glass | 1.517 | 64.167 | — |
| 12 | | Infinity | 0.045 | | | | |
| 13 | Image | Infinity | Infinity | | | | |

TABLE 8

| Aspheric Coefficients | | | |
|---|---|---|---|
| surface # | 3 | 4 | 5 |
| K = | 6.5487E+00 | 6.1435E−01 | −1.2102E+00 |
| A = | −5.2641E−01 | 1.9640E−02 | 1.0420E+00 |
| B = | −1.1052E+01 | −1.6051E+01 | −2.5773E+01 |
| C = | 1.0110E+01 | 1.9842E+01 | 3.6952E+02 |
| D = | 3.3874E+03 | −1.4539E+03 | −1.3328E+03 |
| E = | −5.7513E+04 | 7.9893E+03 | −1.7640E+03 |
| F = | 3.3002E+05 | −2.7785E+04 | 1.9603E+04 |
| surface # | 6 | 7 | 8 |
| K = | −4.7900E−01 | −6.2950E+00 | −1.5064E+00 |
| A = | 3.3289E−01 | 1.3469E−01 | −7.9997E−01 |
| B = | 5.5854E+00 | −1.2621E+00 | 1.1460E+00 |
| C = | 1.0169E+01 | 2.7533E+00 | −1.1665E+00 |
| D = | 1.6981E+01 | −4.7837E+00 | 5.1415E−01 |
| E = | −2.0376E+02 | 8.0219E+00 | −6.2778E−01 |
| F = | 1.4379E+02 | −1.2976E+01 | 7.4473E−01 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f | 1.301 | f/TL | 0.5920 |
| Fno | 2.0 | CT1/CT2 | 2.1386 |
| FOV | 84 | T12/CT2 | 0.7935 |
| f1/f2 | −0.4660 | T23/CT3 | 0.1133 |
| f2/f3 | −0.6526 | CT3/CT2 | 0.9805 |
| f12/f3 | 0.6384 | R2/R3 | 2.6046 |
| f1/f3 | 0.3041 | R4/R5 | −0.7677 |
| f1/f23 | −0.0974 | V1−V2 | 32.1 |
| f23/f | −7.7254 | | |

In the present optical lens system, the lens elements can be made of plastic or glass. If the lens elements are made of plastic, the cost will be effectively reduced. If the lens elements are made of glass, there is more freedom in distributing the refractive power of the optical lens system. Plastic lens elements can have aspheric surfaces, which allow more design parameter freedom (than spherical surfaces), so as to reduce the aberration and the number of the lens elements, as well as the total track length of the optical lens system.

In the present optical lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The optical lens system of the present invention can be used in focusing optical systems and can obtain better image quality. The optical lens system of the present invention can also be used in electronic imaging systems, such as, 3D image capturing, digital camera, mobile device, digital flat panel or vehicle camera.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens system with a wide field of view, in order from an object side to an image side, comprising:
   a stop;
   a first lens element with a positive refractive power having an object-side surface being convex near an optical axis and an image-side surface being convex near the optical axis, at least one of the object-side surface and the image-side surface of the first lens element being aspheric;
   a second lens element with a negative refractive power having an object-side surface being concave near the optical axis and an image-side surface being convex near the optical axis, at least one of the object-side surface and the image-side surface of the second lens element being aspheric; and
   a third lens element with a positive refractive power having an object-side surface being convex near the optical axis and an image-side surface being concave near the optical axis, at least one of the object-side surface and the image-side surface of the third lens element being aspheric and provided with at least one inflection point;
   wherein a focal length of the first lens element and the second lens element combined is f12, a focal length of the first lens element is f1, a focal length of the second lens element is f2, a focal length of the third lens element is f3, a central thickness of the first lens element along the optical axis is CT1, a central thickness of the second lens element along the optical axis is CT2, and they satisfy the relations:

$0.3 < f12/f3 < 0.9;$ $-0.7 < f1/f2 \leq -0.4688;$ $1.7234 \leq CT1/CT2 < 2.5.$

2. The optical lens system as claimed in claim 1, wherein the focal length of the second lens element is f2, the focal length of the third lens element is f3, and they satisfy the relation:

$-0.85 < f2/f3 < -0.35.$

3. The optical lens system as claimed in claim 1, wherein the focal length of the first lens element is f1, the focal length of the third lens element is f3, and they satisfy the relation:

$0.1 < f1/f3 < 0.45.$

4. The optical lens system as claimed in claim 1, wherein the focal length of the first lens element is f1, a focal length of the second lens element and the third lens element combined is f23, and they satisfy the relation:

$-0.45 < f1/f23 < -0.05.$

5. The optical lens system as claimed in claim 1, wherein a focal length of the optical lens system with a wide field of view is f, a focal length of the second lens element and the third lens element combined is f23, and they satisfy the relation:

$-8 < f23/f < -1.7.$

6. The optical lens system as claimed in claim 1, wherein a focal length of the optical lens system with a wide field of view is f, a distance from the object-side surface of the first lens element to the image plane along the optical axis is TL, and they satisfy the relation:

$$0.5 < f/TL < 0.8.$$

7. The optical lens system as claimed in claim 1, wherein the optical lens system has a maximum view angle FOV, and it satisfies the relation:

$$75 < FOV < 95.$$

8. The optical lens system as claimed in claim 1, wherein a distance along the optical axis between the first lens element and the second lens element is T12, the central thickness of the second lens element along the optical axis is CT2, and they satisfy the following relation:

$$0.5 < T12/CT2 < 0.95.$$

9. The optical lens system as claimed in claim 1, wherein a distance along the optical axis between the second lens element and the third lens element is T23, a central thickness of the third lens element along the optical axis is CT3, and they satisfy the following relation:

$$0.05 < T23/CT3 < 0.7.$$

10. The optical lens system as claimed in claim 1, wherein the central thickness of the second lens element along the optical axis is CT2, a central thickness of the third lens element along the optical axis is CT3, and they satisfy the following relation:

$$0.9 < CT3/CT2 < 1.9.$$

11. The optical lens system as claimed in claim 1, wherein a radius of curvature of the image-side surface of the first lens element is R2, a radius of curvature of the object-side surface of the second lens element is R3, and they satisfy the following relation:

$$2.4 < R2/R3 < 3.7.$$

12. The optical lens system as claimed in claim 1, wherein a radius of curvature of the image-side surface of the second lens element is R4, a radius of curvature of the object-side surface of the third lens element is R5, and they satisfy the following relation:

$$-1.55 < R4/R5 < -0.5.$$

13. The optical lens system as claimed in claim 1, wherein an Abbe number of the first lens element is V1, an Abbe number of the second lens element is V2, and they satisfy the following relation:

$$30 < V1 - V2 < 42.$$

* * * * *